(12) United States Patent
Roberge et al.

(10) Patent No.: US 10,363,634 B2
(45) Date of Patent: *Jul. 30, 2019

(54) DEPOSITED STRUCTURE WITH INTEGRAL COOLING ENHANCEMENT FEATURES

(71) Applicant: UNITED TECHNOLOGIES CORPORATION, Farmington, CT (US)

(72) Inventors: Gary D. Roberge, Tolland, CT (US); William J. Brindley, Hebron, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/388,485

(22) Filed: Dec. 22, 2016

(65) Prior Publication Data

US 2018/0178332 A1 Jun. 28, 2018

(51) Int. Cl.
*B23P 15/02* (2006.01)
*C23C 4/18* (2006.01)
(Continued)

(52) U.S. Cl.
CPC .............. *B23P 15/02* (2013.01); *B22F 5/003* (2013.01); *B33Y 10/00* (2014.12); *B33Y 80/00* (2014.12); *C23C 4/02* (2013.01); *C23C 4/185* (2013.01); *C23C 24/02* (2013.01); *C23C 24/04* (2013.01); *B22F 3/1055* (2013.01); *B22F 2005/103* (2013.01); *F01D 25/12* (2013.01);
(Continued)

(58) Field of Classification Search
CPC .................................................. F05D 2220/32
See application file for complete search history.

(56) References Cited

U.S. PATENT DOCUMENTS 5,626,462 A 5/1997 Jackson
6,308,765 B1 * 10/2001 Grinberg ................... B22C 9/06
164/34
(Continued)

FOREIGN PATENT DOCUMENTS

DE 102004035773 1/2006
DE 102009037894 2/2011
(Continued)

OTHER PUBLICATIONS

U.S. Appl. No. 15/388,172, filed Dec. 22, 2016 and entitled Deposited Material Structure With Integrated Component.
(Continued)

Primary Examiner — Colleen P Dunn
Assistant Examiner — Rajinder Bajwa
(74) Attorney, Agent, or Firm — Snell & Wilmer L.L.P.

(57) ABSTRACT

A method for forming a metallic structure having a non-linear aperture includes providing a main tool having a formation surface corresponding to a desired structure shape of the metallic structure. The method also includes attaching a removable tool having a shape corresponding to a desired aperture shape of the non-linear aperture to the main tool. The method also includes depositing a layer of material on the formation surface using a cold-spray technique. The method also includes removing the removable tool from the layer of material such that the layer of material defines the non-linear aperture.

12 Claims, 10 Drawing Sheets

(51) Int. Cl.
| | |
|---|---|
| *B33Y 80/00* | (2015.01) |
| *B33Y 10/00* | (2015.01) |
| *B22F 3/105* | (2006.01) |
| *B22F 5/00* | (2006.01) |
| *C23C 4/02* | (2006.01) |
| *C23C 24/02* | (2006.01) |
| *C23C 24/04* | (2006.01) |
| *B22F 5/10* | (2006.01) |
| *F01D 25/12* | (2006.01) |

(52) U.S. Cl.
CPC ...... *F05D 2220/32* (2013.01); *F05D 2230/31* (2013.01); *F05D 2260/96* (2013.01); *F05D 2300/10* (2013.01); *Y02P 10/295* (2015.11)

(56) References Cited

U.S. PATENT DOCUMENTS

| | | |
|---|---|---|
| 6,527,038 B1 | 3/2003 | Jordan |
| 2003/0000675 A1 | 1/2003 | Fried |
| 2004/0202886 A1 | 10/2004 | Subramanian |
| 2006/0108031 A1 | 5/2006 | Haynes |
| 2006/0166020 A1 | 7/2006 | Raybould |
| 2009/0120539 A1* | 5/2009 | Ko .......................... C23C 24/04 148/513 |
| 2010/0051718 A1 | 3/2010 | Vanderzwet |
| 2010/0172789 A1 | 7/2010 | Calla |
| 2011/0305892 A1 | 12/2011 | Schlichting |
| 2012/0114868 A1* | 5/2012 | Bunker ................... B23P 15/04 427/448 |
| 2012/0171041 A1 | 7/2012 | Jakimov |
| 2013/0180432 A1 | 7/2013 | Calla |
| 2014/0277669 A1 | 9/2014 | Nardi |
| 2014/0356219 A1 | 12/2014 | Gammel |
| 2015/0147479 A1 | 5/2015 | Bunker |
| 2017/0173611 A1 | 6/2017 | Tan |
| 2018/0056395 A1 | 3/2018 | Hofacker |
| 2018/0119300 A1 | 5/2018 | Yang |
| 2018/0162060 A1 | 6/2018 | Mark |

FOREIGN PATENT DOCUMENTS

| | | |
|---|---|---|
| DE | 102014206073 | 10/2015 |
| EP | 0911426 | 4/1999 |
| EP | 1942209 | 7/2008 |
| EP | 2261397 | 12/2010 |
| EP | 2806711 | 11/2014 |
| EP | 2881489 | 6/2015 |
| WO | 2008056345 | 5/2008 |
| WO | 2011042090 | 4/2011 |
| WO | 2014096822 | 6/2014 |
| WO | 2014116256 | 7/2014 |
| WO | 2016064460 | 4/2016 |

OTHER PUBLICATIONS

U.S. Appl. No. 15/388,223, filed Dec. 22, 2016 and entitled Material Deposition to Form a Sheet Structure.
U.S. Appl. No. 15/388,286, filed Dec. 22, 2016 and entitled Modular Tooling for a Deposited Structure.
U.S. Appl. No. 15/388,392, filed Dec. 22, 2016 and entitled Reinforcement of a Deposited Structure Forming a Metal Matrix Composite.
U.S. Appl. No. 15/388,649, filed Dec. 22, 2016 and entitled Multi-Wall Deposited Thin Sheet Structure.
U.S. Appl. No. 15/388,567, filed Dec. 22, 2016 and entitled Reinforcement of a Deposited Metallic Structure Using Reinforcing Particles.
Invitation Pursuant to Rule 63(1) EPC dated Mar. 14, 2018 in European Application No. 17199941.0.
USPTO, Restriction/Election Requirement dated Jan. 9, 2019 in U.S. Appl. No. 15/388,567.
USPTO, Restriction/Election Requirement dated Jan. 30, 2019 in U.S. Appl. No. 15/388,172.
European Patent Office, European Search Report dated Mar. 13, 2018 in Application No. 17199958.4-1103.
European Patent Office, European Search Report dated Mar. 26, 2018 in Application No. 17204011.5-1108.
T. Hussain et al: "Corrosion Behavior of Cold Sprayed Titanium Coatings and Free Standing Deposits" , Journal of Thermal Spray Technology., vol. 20, No. 1-2, Aug. 11, 2010 (Aug. 11, 2010), pp. 260-274.
European Patent Office, European Search Report dated Apr. 20, 2018 in Application No. 17204011.5-1108.
European Patent Office, European Search Report dated Apr. 24, 2018 in Application No. 17204167.5-1108.
European Patent Office, European Search Report dated May 9, 2018 in Application No. 17209711.5-1108.
European Patent Office, European Search Report dated May 22, 2018 in Application No. 17199605.1-1103.
European Patent Office, European Search Report dated May 29, 2018 in Application No. 17199941.0-1103.
Pattison et al: "Cold gas dynamic manufacturing: A non-thermal approach to freeform fabrication", International Journal of Machine Tool Design and Resea, Pergamon Press, Oxford, GB, vol. 47, No. 3-4, Dec. 15, 2006 (Dec. 15, 2006), pp. 627-634.
European Patent Office, European Office Action dated Feb. 14, 2019 in Application No. 17204011.5.
USPTO, Non-Final Office Action dated Feb. 14, 2019 in U.S. Appl. No. 15/388,567.
European Patent Office, European Office Action dated Feb. 26, 2019 in Application No. 17199941.0.
USPTO, Restriction/Election Requirement dated Feb. 27, 2019 in U.S. Appl. No. 15/388,223.
USPTO, Restriction/Election Requirement dated Mar. 11, 2019 in U.S. Appl. No. 15/388,286.
USPTO, Restriction/Election Requirement dated Mar. 5, 2019 in U.S. Appl. No. 15/388,392.
USPTO, Non-Final Office Action dated Mar. 13, 2019 in U.S. Appl. No. 15/388,172.
Gibson I., Rosen D., Stucker B. (2010), "Additive Manufacturing Technologies", Springer, Boston, MA, p. 407-412, Year: 2010.
USPTO, Restriction/Election Requirement dated Apr. 9, 2019 in U.S. Appl. No. 15/388,649.
European Patent Office, European Office Action dated Feb. 13, 2019 in Application No. 17204167.5.
USPTO, Final Office Action dated May 10, 2019 U.S. Appl. No. 15/388,567.
USPTO, Non-Final Office Action dated May 21, 2019 U.S. Appl. No. 151388,223.
USPTO, Non-Final Office Action dated May 21, 2019 U.S. Appl. No. 15/388,286.
USPTO, Final Office Action dated May 24, 2019 U.S. Appl. No. 15/388,172.
USPTO, Non-Final Office Action dated Jun. 4, 2019 U.S. Appl. No. 15/388,392.
USPTO, Advisory Action dated Jun. 11, 2019 U.S. Appl. No. 15/388,567.

\* cited by examiner

DEPOSITED STRUCTURE WITH INTEGRAL COOLING ENHANCEMENT FEATURES

FIELD

The present disclosure is directed to a system and a method for creation of a metallic structure for use in an aircraft and having at least one non-linear aperture extending therethrough.

BACKGROUND

Gas turbine engines include multiple components, a portion of which are formed as sheet structures. These sheet structures are currently hot or cold formed using dies. The dies include a relatively durable material that is capable of withstanding the temperature, pressure, and other loads applied to the die via the selected forming operation. The material used in the dies may be relatively expensive. Furthermore, formation of dies is a relatively time-consuming and expensive process. The time and expense of forming the dies increases as the complexity, such as complex contours and size, of the desired part increases.

In various applications, the sheet structure is utilized in situations with relatively harsh thermal environments. In such environments, inclusion of cooling features in the sheet structure is desirable. Conventional investment casting processes for creating such intra-wall cooling passages may not be consistent with a size and shape of a desired sheet structure, hence, an alternative process for creating such cooling passages is desirable.

SUMMARY

Disclosed herein is a method for forming a metallic structure having a non-linear aperture. The method includes providing a main tool having a formation surface corresponding to a desired structure shape of the metallic structure. The method also includes attaching a removable tool having a shape corresponding to a desired aperture shape of the non-linear aperture to the main tool. The method also includes depositing a layer of material on the formation surface using a cold-spray technique. The method also includes removing the removable tool from the layer of material such that the layer of material defines the non-linear aperture.

Any of the foregoing embodiments may also include removing the layer of material from the main tool to separate the metallic structure having the non-linear aperture from the main tool.

Any of the foregoing embodiments may also include forming a base layer of material on the formation surface using the cold-spray technique prior to attaching the removable tool to the main tool.

Any of the foregoing embodiments may also include positioning a temporary tool into a slot defined by the main tool prior to forming the base layer of material on the formation surface.

Any of the foregoing embodiments may also include removing the temporary tool from the slot after forming the base layer of material on the formation surface and prior to attaching the removable tool to the main tool.

In any of the foregoing embodiments, attaching the removable tool to the main tool includes positioning a connection end of the removable tool into the slot defined by the main tool.

Any of the foregoing embodiments may also include forming a low thermal conductivity coating on a surface of the metallic structure.

In any of the foregoing embodiments, removing the removable tool includes leaching the removable tool from the layer of material via at least one of etching the removable tool from the layer of material or melting the removable tool from the layer of material.

In any of the foregoing embodiments, the removable tool has at least two bends such that the non-linear aperture includes a first portion extending into the metallic structure from a first surface of the metallic structure, a second portion extending into the metallic structure from a second surface of the metallic structure, and a third portion extending from the first portion to the second portion.

In any of the foregoing embodiments, the removable tool resembles a grid, a rounded spiral, or a rectilinear spiral.

In any of the foregoing embodiments, a portion of the removable tool has a conical shape such that the non-linear aperture has a diffusion feature corresponding to the conical shape.

In any of the foregoing embodiments, the metallic structure is used in a gas turbine engine, and the non-linear aperture provides a channel for cooling fluid or acoustic attenuation.

In any of the foregoing embodiments, depositing the layer of material on the formation surface using the cold-spray technique includes manipulating a cold spray gun to have a direct line of sight to deposit the layer of material on all desired portions of the formation surface.

Any of the foregoing embodiments may also include depositing a second layer of material on a second surface of the layer of material to fill any voids defined by the removable tool.

Also described is a system for forming a metallic structure having a non-linear aperture. The system includes a main tool having a formation surface corresponding to a desired structure shape of the metallic structure. The system also includes a removable tool having a shape corresponding to a desired aperture shape of the non-linear aperture and configured to be attached to the main tool. The system also includes a cold-spray gun configured to output a gas including particles of a material towards the formation surface at a velocity sufficiently great to cause the particles of the material to bond together on the formation surface of the main tool to form a layer of material on the formation surface. The system also includes a means for removing the removable tool from the layer of material such that the layer of material defines the non-linear aperture.

Any of the foregoing embodiments may also include a temporary tool configured to be positioned into a slot defined by the main tool.

In any of the foregoing embodiments, the removable tool has at least two bends such that the non-linear aperture includes a first portion extending into the metallic structure from a first surface of the metallic structure, a second portion extending into the metallic structure from a second surface of the metallic structure, and a third portion extending from the first portion to the second portion.

Also described is a metallic structure having a non-linear aperture prepared by a method. The method includes providing a main tool having a formation surface corresponding to a desired structure shape of the metallic structure. The method also includes attaching a removable tool having a shape corresponding to a desired aperture shape of the non-linear aperture to the main tool. The method also includes depositing a layer of material on the formation surface using a cold-spray technique. The method also includes removing the removable tool from the layer of material such that the layer of material defines the non-linear aperture.

In any of the foregoing embodiments, the method further includes forming a base layer of material on the formation surface using the cold-spray technique prior to attaching the removable tool to the main tool.

In any of the foregoing embodiments, the method further includes positioning a temporary tool into a slot defined by the main tool prior to forming the base layer of material on the formation surface, and removing the temporary tool from the slot after forming the base layer of material on the formation surface and prior to attaching the removable tool to the main tool.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
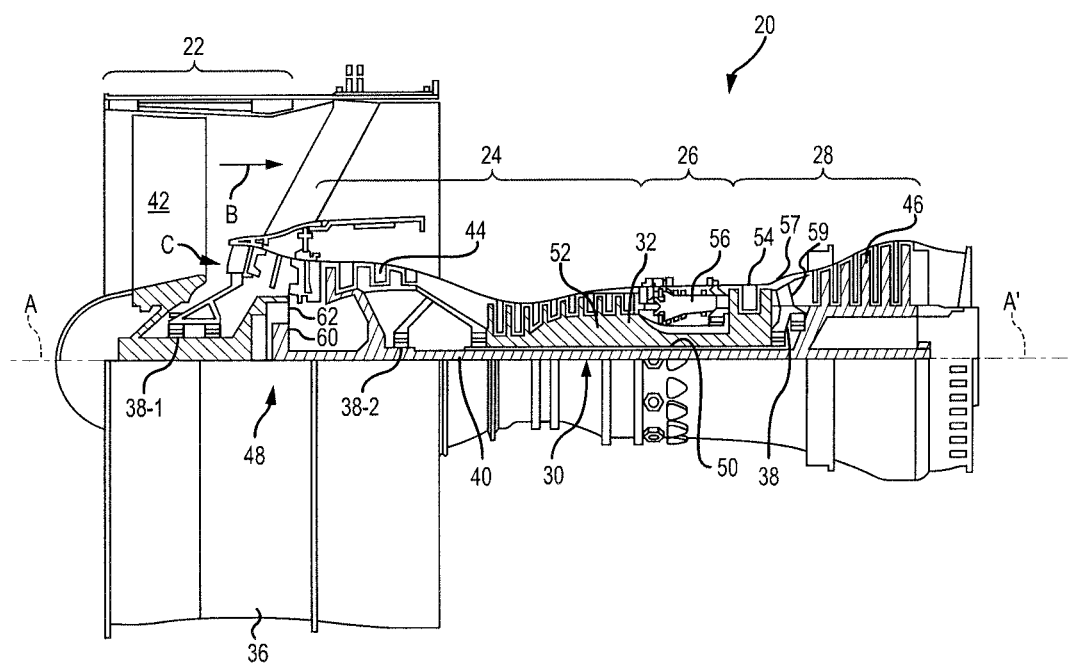
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Various components of gas turbine engine 20 may include one or more sheet structures. A sheet structure may include a relatively flat structure having a fairly broad surface relative to its thickness. For example, a sheet structure may have a thickness between 10 thousandths of an inch (0.0.254 millimeters) and 0.5 inches (12.7 millimeters), or between 15 thousandths of an inch (0.0.381 millimeters) and 250 thousandths of an inch (6.35 millimeters).

Figure 2:
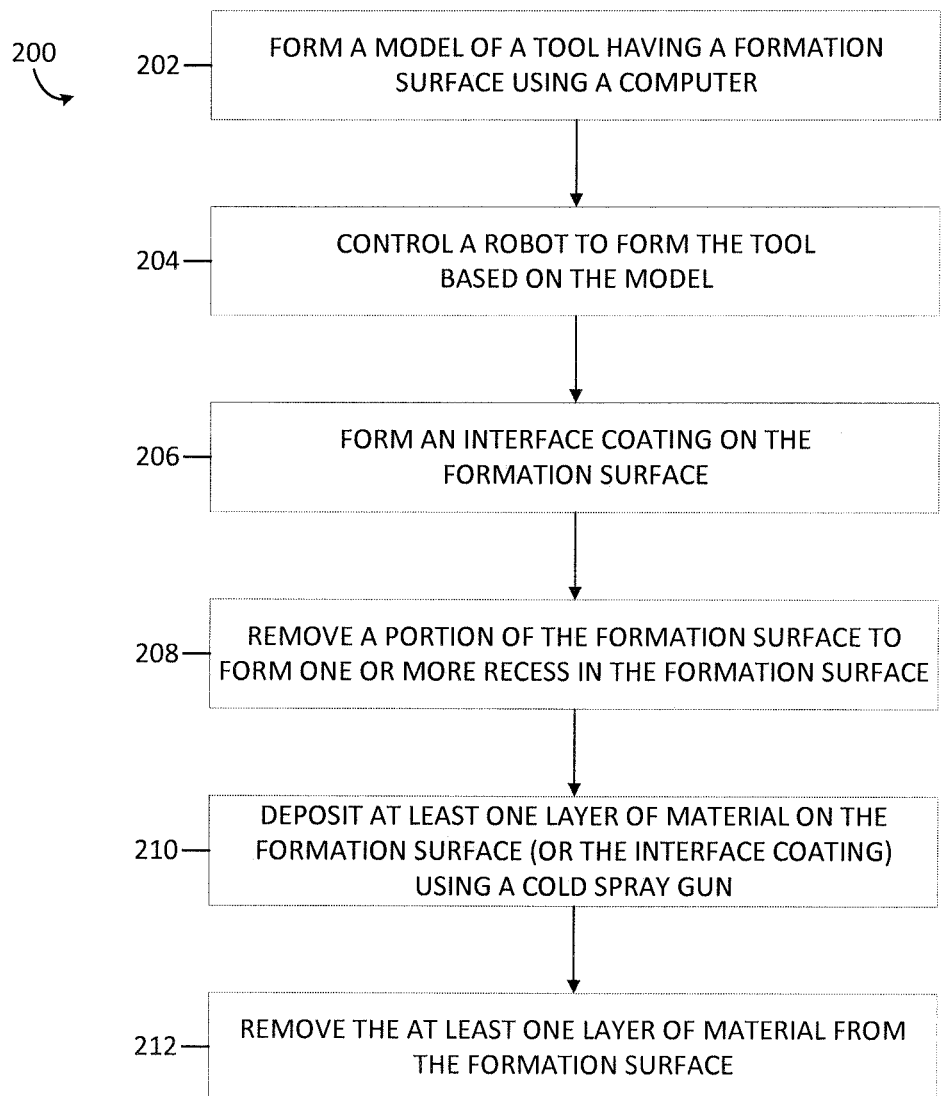
FIG. 2 is a flowchart illustrating a method for forming a sheet structure usable in the gas turbine engine of FIG. 1 using a cold-spray technique, in accordance with various embodiments.

Conventional processes for manufacturing such sheet structures are relatively expensive and time-consuming. Referring to FIG. 2, a method 200 for forming a sheet structure using a cold-spray process is shown. Formation of a sheet structure using the method 200 may be less expensive and less time-consuming than conventional processes. In various embodiments, the method 200 may be used to form sheet structures having a relatively large size. For example, the method 200 may be used to form sheet structures having a surface area of at least 1 inch squared (1 in.$^2$, 2.54 centimeters squared (cm$^2$)), 10 in.$^2$ (25.4 cm$^2$), 36 in.$^2$ (91.44 cm$^2$), or 100 in.$^2$ (254 cm$^2$).

In block 202, a computer is used to create a model of a tool. A computer may include a processor, a memory, and input device, and an output device. A computer may include one or more computers having processors and one or more tangible, non-transitory memories and be capable of implementing logic. The processor(s) can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof. The memory may be any non-transitory memory capable of storing data. For example, the memory may store instructions to be executed by the processor, may store modeling software, may store a model of a component, or the like. The input device may include, for example, a mouse, a keyboard, a microphone, or the like. The output device may include, for example, a display, a speaker, an input/output port, or the like.

The tool may include a formation surface on which a material of the sheet structure is deposited. In that regard, the tool may be modeled such that the formation surface corresponds to a desired shape of the sheet structure. The tool may be modeled using any three-dimensional modeling software such as SolidWorks™, available from Dassault Systèmes of Vélizy-Villacoublay, France.

The tool may include any material having sufficient yield strength to resist the formation in response to receiving spray from a cold-spray gun. As will be described below, a cold-spray deposition technique delivers material at a relatively low temperature. Accordingly, the tool may include materials having a relatively low thermal resistance, which may result in lower cost of the tools. For example, the tool may include a metal, a plastic, or another compound material such as nylon, polymers, high-temperature resins, aluminum, low melt alloys, or the like. A low melt alloy may include any metallic alloy that has a melting temperature of 450 degrees Fahrenheit (450 degrees F., 233 degrees Celsius (C.)) or below. For example, a low melt alloy may include one or more of bismuth, lead, tin, cadmium, indium, and the like. Selection of a material for the tool may be based considering the cost of the material of the tool and a durability of the tool.

In block 204, a robot is controlled to form the tool based on the computer-generated model. The tool may be formed using additive manufacturing, such as stereolithography. In that regard, the robot may be an additive manufacturing device, such as a 3-D printer, connected to the computer. The computer may be electrically coupled to the additive manufacturing device such that the device forms the tool based on the model. In various embodiments, the robot may include a machine separate from the additive manufacturing device and may independently control the additive manufacturing device based on the computer-generated model. In various embodiments, a user may receive the model from the computer and may manually provide information corresponding to the model to an additive manufacturing device.

In block 206, an interface coating may be applied to the formation surface of the tool. The interface coating may include, for example, a metal formed on the formation surface using electroplating. The interface material may include, for example, an epoxy or low melt alloy. In that regard, the interface coating may provide various benefits such as erosion protection of the tool, thermal protection of the tool, generation of a desired surface finish or feature, facilitation of separation of the sheet structure from the tool, and increased rigidity and resistance to deformation resulting from contact with relatively high-velocity spray from a cold-spray gun. In that regard, the formation surface of the tool may include one or both of the interface material or the material of the tool.

In various embodiments, it may be desirable to form one or more features, such as ribs, in the sheet structure that have great thickness relative to other portions of the sheet structure. In order to form the feature, a portion of the formation surface may be removed to form one or more recess in the formation surface in block 208. In response to the sheet structure material being cold-sprayed onto the formation surface, additional material may collect in the recess such that the corresponding part of the sheet structure has a greater thickness at the location corresponding to the recess. In various embodiments, the tool may be formed to have the recess such that removal of a portion of the formation surface is optional.

In block 210, at least one layer of material may be cold-sprayed onto the formation surface (or the interface coating) using a cold-spray deposition technique that utilizes a cold-spray gun. A cold-spray deposition technique is based on direct additive deposition of fine metallic particles that are accelerated to supersonic speeds using inert gas and a cold-spray gun. Inert gas may include at least one of an inert gas, air, or a less reactive gas, such as nitrogen. The cold-spray gun outputs a gas that includes the metallic particles and the inert gas. The output gas is directed towards the formation surface. The kinetic energy used in the process enables bonding of the metallic particles to each other on the formation surface of the tool, allowing the metallic particles to bind together to form the sheet structure. In various embodiments, the inert gas may be heated to a temperature that is between 400 degrees F. (204.4 degrees C.) and 1000 degrees F. (537.8 degrees C.). The temperature of the inert gas may, however, remain significantly below the melting point of the material of the metallic particles. In this context, significantly may refer to 5 percent (5%), or 15%, or 25%.

In various embodiments, it may be desirable for the sheet structure to have a greater relative thickness at particular locations. In that regard, the cold-spray gun may be used to apply more of the metallic particles to the particular locations to increase the thickness at the particular locations.

In various embodiments, the cold-spray gun may be controlled by at least one of a computer or a robot. In that regard, the computer or robot may be programmed to spray a predetermined amount of the metallic particles at each location of the sheet structure. The predetermined amount of the metallic particles sprayed at each location may result in each location of the sheet structure achieving the desired thickness.

Using a computer, and an electromechanical control system that is controlled by the computer, to control the cold-spray gun may result in a relatively accurate deposition of the metallic particles. The computer (or a user) may control such deposition factors as rate of discharge of the metallic particles, a distance from the tool from which the cold-spray gun is used, and the rate of movement of the cold-spray gun relative to the tool to adjust the thickness of the sheet structure.

A cold-spray gun outputs a relatively narrow plume of the output gas. This relatively narrow plume results in an ability to precisely position the metallic particles where desired.

The metallic particles used to form the sheet structure may include various metals and corresponding alloys such as, for example, titanium, nickel, aluminum and titanium aluminide alloys, cobalt alloys, or the like.

In block 212, the at least one layer of material (corresponding to the sheet structure) may be removed from the formation surface. This sheet structure may be removed in a variety of manners. In various embodiments, the sheet structure may be physically manipulated away from the formation surface by applying a force to the sheet structure in a direction away from the formation surface. In various embodiments, this physical manipulation may be performed by a user grasping a portion of the sheet structure, may be performed by a user using a tool, such as a crowba, to separate the sheet structure from the tool, or the like. In various embodiments, the tool may be constructed such that introduction of pressurized fluid causes flexure of the tool (potentially including the formation surface), thus facilitating release of the sheet structure. In various embodiments, water or another fluid may be introduced between the formation surface and the sheet structure via capillary action or other means. In that regard, the fluid may be frozen (and thus expand), exerting a separating force/pressure to facilitate release of the sheet structure.

In various embodiments, a releasing agent may be applied between the sheet structure and the tool to facilitate release of the sheet structure from the formation surface. The release agent may include, for example, Boron Nitride (i.e., a hexagonal boron nitride). The release agent may be applied between the sheet structure and the formation surface or between the formation surface and the interface coating prior to cold-spray deposition of the metallic particles or after cold-spray deposition of the metallic particles. The properties of the release agent may result in a weaker bond between the sheet structure and the tool, allowing the sheet structure to be removed from the tool with relative ease. In various embodiments, the release agent may be used and the sheet structure may still be physically manipulated away from the formation surface.

In various embodiments, the combination of the tool and the sheet structure may be heated to such a temperature that the sheet structure does not deform yet the tool, or interface coating, deforms or de-bonds from the sheet structure, facilitating release of the sheet structure. In various embodiments, the interface coating may include an adhesive having a melting point above that of the temperature of the cold-spray gas and below that of the sheet structure. In that regard, the sheet structure and the interface coating may be heated to the melting point of the interface coating, facilitating release of the sheet structure. The interface coating may then be reapplied to the tool prior to a new sheet structure being formed on the tool.

In various embodiments, the sheet structure may be etched from the tool. For example, an acid such as a Bronsted-Lowry acid or another etching agent or chemically reactive material may be applied to the tool, thereby etching the tool away from the sheet structure.

In various embodiments, additional operations may be performed on the sheet structure to complete the part after separation from the tool. For example, the additional operations may include machining of interfaces, welding of the part to additional parts, forming an integral portion of the sheet structure using a cold-spray deposition technique with a different tool, or the like.

Figure 3:
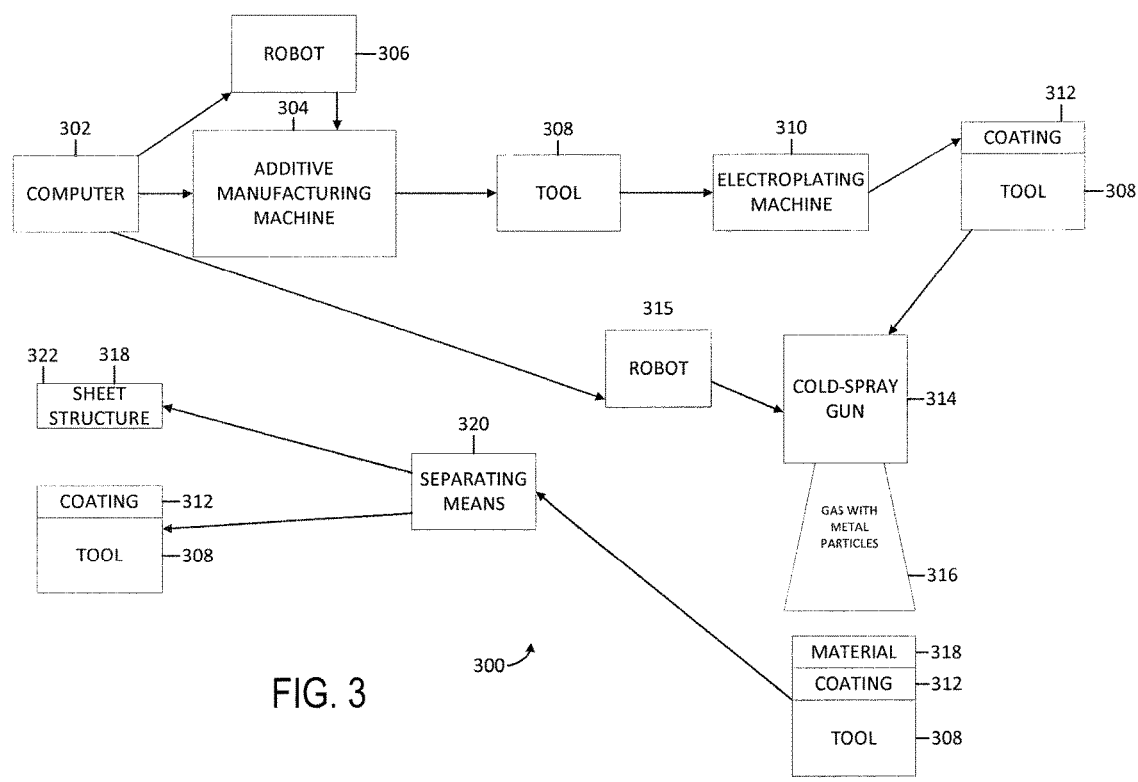
FIG. 3 is a block diagram illustrating a system for forming a sheet structure using a cold-spray technique, in accordance with various embodiments.

Turning now to FIG. 3, a system 300 for implementing the method 200 of FIG. 2 is shown. The system 300 includes a computer 302 in communication with an additive manufacturing machine 304 and a robot 306. In various embodiments, the robot 306 may not be present in the system 300. In various embodiments, the tool may be made using a machine different from the additive manufacturing machine 304.

A user may create a model of a tool using the computer 302. In various embodiments, the model may be received by the robot 306 and/or the additive manufacturing machine 304 which may, in turn, form a tool 308. In various embodiments, a user may provide the model to the robot 306 and/or the additive manufacturing machine 304. In various embodiments, a user may manually control the additive manufacturing machine 304 to create the tool 308.

The tool 308 may then be provided to an electroplating machine 310 or another device, which may apply an interface coating 312 on the tool 308. In various embodiments, the electroplating machine 310 may not be present in the system 300 such that no interface coating is applied. In various embodiments, the interface coating 312 may be applied via brushing, spraying, or another device. In various embodiments, the electroplating machine 310 may be controlled by the computer 302 or by another computer or robot to form the interface coating 312.

After the interface coating 312 is applied to the tool 308, the combined tool 308 and interface coating 312 may be subjected to spray from a cold-spray gun 314. The cold-spray gun 314 may direct a gas with metallic particles 316 towards the tool 308 and the interface coating 312. The gas with metallic particles 316 may hit the interface coating 312 and may begin to form one or more layer of material 318 on the interface coating 312. In various embodiments, the cold-spray gun 314 may be controlled by the computer 302 and/or by a robot 315. In various embodiments, the cold-spray gun 314 may be controlled by a separate computer or may be independently controlled.

After the material 318 has been applied to the interface coating 312, the combined tool 308, interface coating 312, and material 318 may be subjected to a separating means 320. The separating means 320 may include any method or structure used to separate the material 318 from the interface coating 312 as described above with reference to block 212 of FIG. 2. The separating means 320 may separate the material 318 from the interface coating 312. The resulting material 318 may correspond to a sheet structure 322.

Figure 4A:
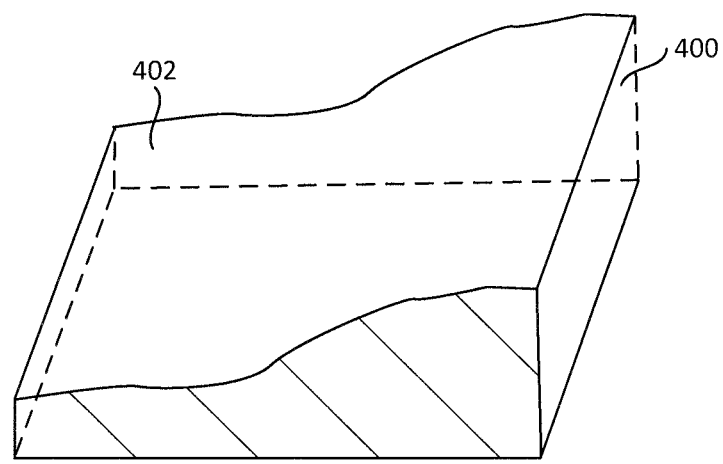
FIG. 4A is a drawing of a tool used for forming a sheet structure using a cold-spray technique, in accordance with various embodiments.
Figure 4B:
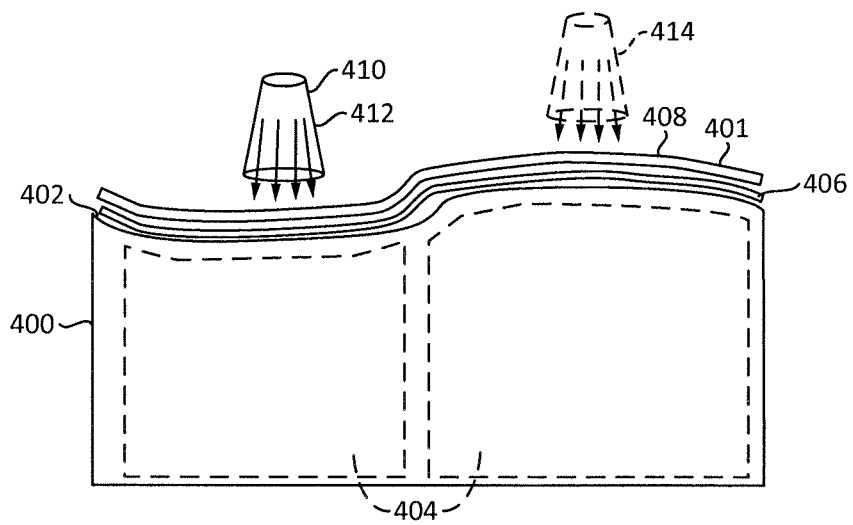
FIG. 4B is a drawing of the tool of FIG. 4A having an interface coating for receiving a cold-spray deposit, in accordance with various embodiments.

Referring now to FIGS. 4A and 4B, an exemplary tool 400 and sheet structure 401 is shown. The tool 400 has a formation surface 402. The formation surface 402 has a shape that corresponds to a desired shape of the sheet structure 401. The tool 400 includes one or more pockets 404 positioned within the tool 400 and having a material that is different from the remaining material of the tool 400. The pockets 404 may be designed to reduce the likelihood of deformation of the tool 400 due to impact with a relatively high velocity gas from a cold-spray gun 410. In that regard, the pockets 404 may include a material having a yield strength that is greater than that of the remaining portions of the tool 400. For example, the pockets 404 may include an epoxy or a low melt alloy.

An interface coating 406 may be applied to the formation surface 402 of the tool 400. The interface coating 406 may provide benefits as described above with reference to FIG. 2.

A cold-spray gun 410 may deposit metallic particles onto the interface coating 406 to form one or more layer of material 408. In order to deposit metallic particles onto the interface coating 406, the cold-spray gun 410 may move relative to the tool 400. For example, the cold-spray gun 410 may move from a first location 412 to a second location 414, depositing metallic particles at desired thicknesses along the way.

After the desirable amount of material 408 has been applied to the interface coating 406, the material 408 may be separated from the interface coating 406 in one or more manners as described above with reference to FIG. 2.

Figure 4C:
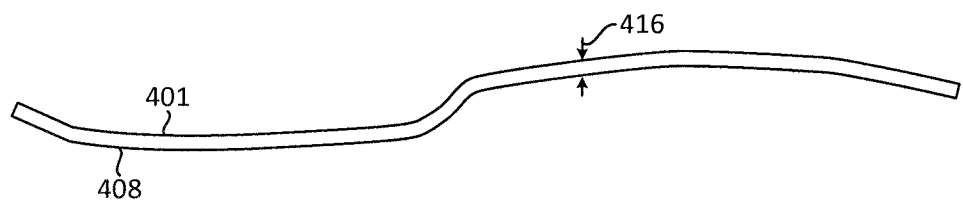
FIG. 4C is a drawing of a sheet structure using the tool and interface coating of FIG. 4B, in accordance with various embodiments.

Referring now to FIGS. 4A, 4B, and 4C, the material 408 that is separated from the interface coating 406 may be the sheet structure 401. As shown, the sheet structure 401 has a shape that corresponds to the shape of the formation surface 402. The sheet structure 401 may have a thickness 416 that corresponds to the amount of metallic particles deposited on the interface coating 406. The cold-spray gun 410 may achieve the desired thickness 416 in one or more of a variety of manners. For example, the desired thickness 416 may be achieved by making a predetermined number of passes over the formation surface 402 with the cold-spray gun 410, may be achieved by adjusting the rate of flow of gas exiting the cold-spray gun 410, may be achieved by adjusting the rate at which the cold-spray gun 410 moves relative to the formation surface 402, or the like.

Figure 5A:
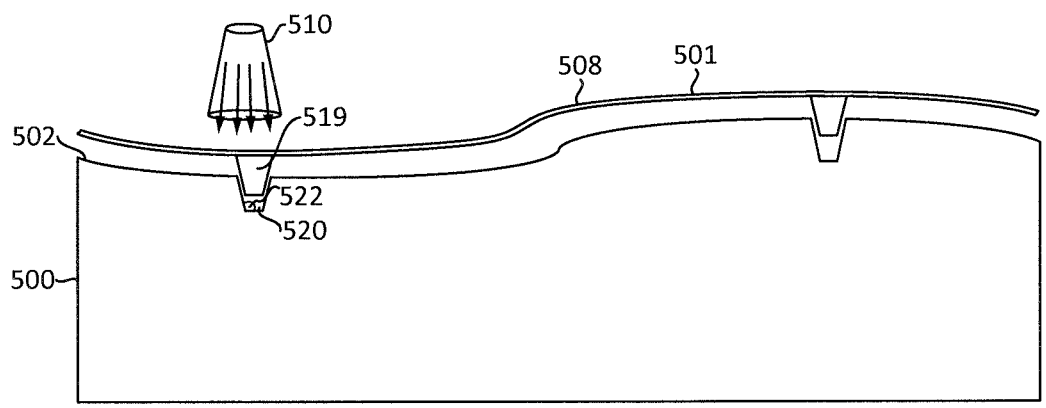
FIG. 5A is a drawing of a tool having a recess in a formation surface for forming a sheet structure with a feature having a greater thickness relative to other portions of the sheet structure, in accordance with various embodiments.
Figure 5B:
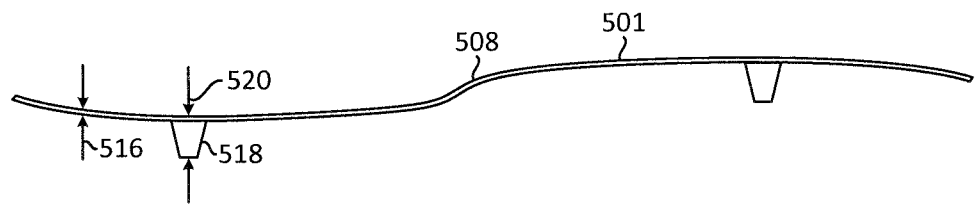
FIG. 5B is a drawing of the sheet structure with the feature formed using the tool of FIG. 5A, in accordance with various embodiments.

Turning now to FIGS. 5A and 5B, another tool 500 may include a formation surface 502 on which at least one layer of material 508 is directly deposited to form a sheet structure 501. Stated differently, the tool 500 may not include an interface coating. The formation surface 502 may have a shape that is similar to the formation surface 402 of FIG. 4A. However, it may be desirable for the sheet structure 501 to have one or more feature 518 such as a rib.

In order to form the feature 518, a portion 519 of the formation surface 502 may be removed from the tool 500 to form a recess 520. In various embodiments, a tool that includes an interface coating may be manipulated such that a portion of the interface coating and/or the formation surface 502 is removed from the tool to form the feature on the sheet structure. In various embodiments, the tool 500 may be formed with the recess 520 in place such that the tool 500 may be used without removal of any of the tool 500.

After the portion 519 of the formation surface 502 is removed, a cold-spray gun 510 may deposit metallic particles on the formation surface 502. In various embodiments, the cold-spray gun 510 may be manipulated across the formation surface 502 to deposit additional material within the recess 520. In various embodiments, the recess 520 may have particular features that facilitate bonding of the metallic particles within the recess 520. For example, the recess 520 may have an angle 522 that is greater than 90 degrees. The angle 522 may allow the metallic particles to bond together and entirely fill the recess 520.

In response to the sheet structure 501 being separated from the formation surface 502, the metal that was deposited in the recess 520 may form the feature 518 such as the rib. In various embodiments, the recess 520 may not be completely filled by the material. In that regard, the sheet structure 501 may have an indentation, or a volume, where the recess 520 is not completely filled.

Figure 6A:
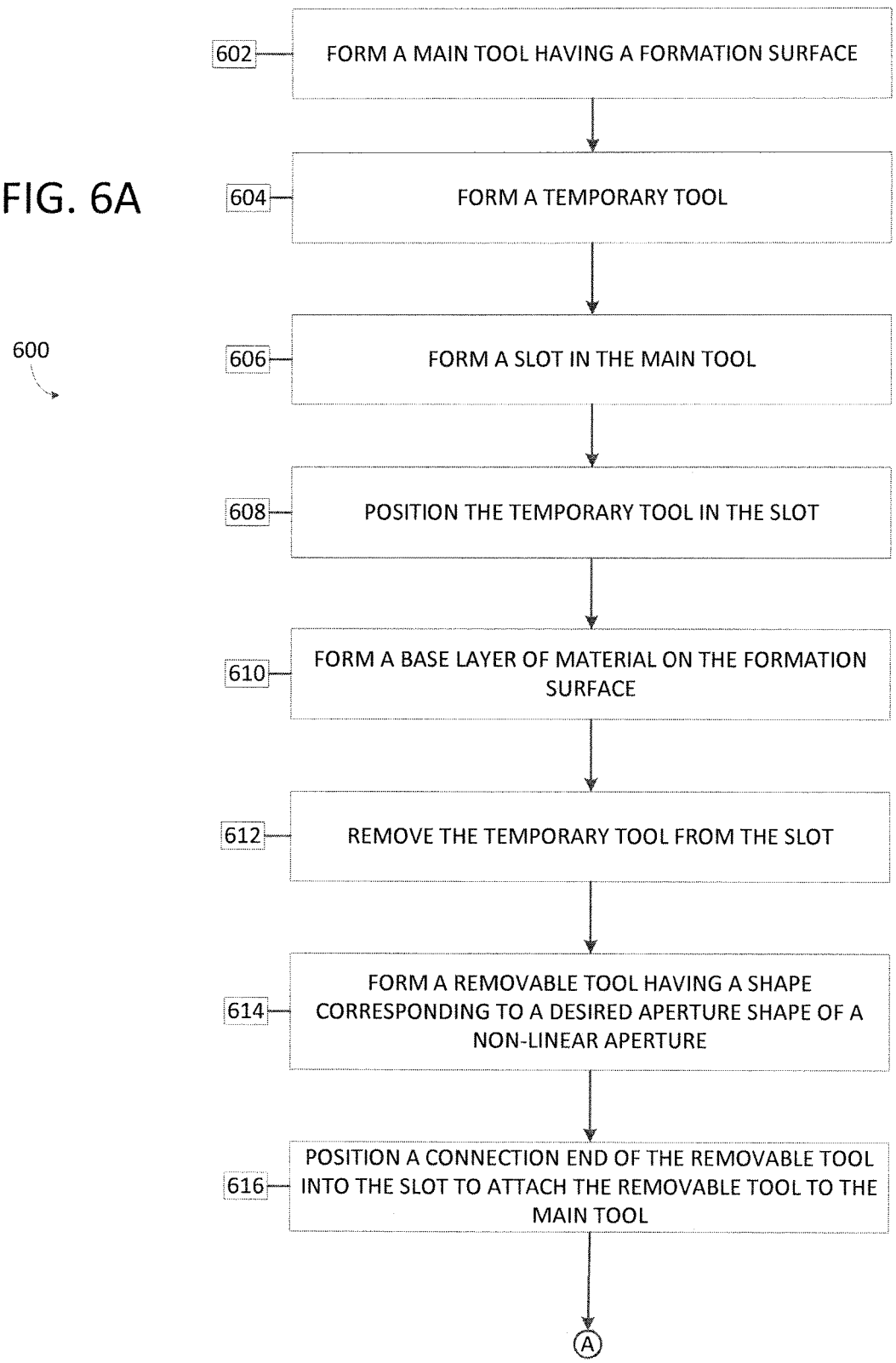
FIGS. 6A and 6B are flowcharts illustrating a method for forming a metallic structure having a non-linear aperture, in accordance with various embodiments.
Figure 6B:
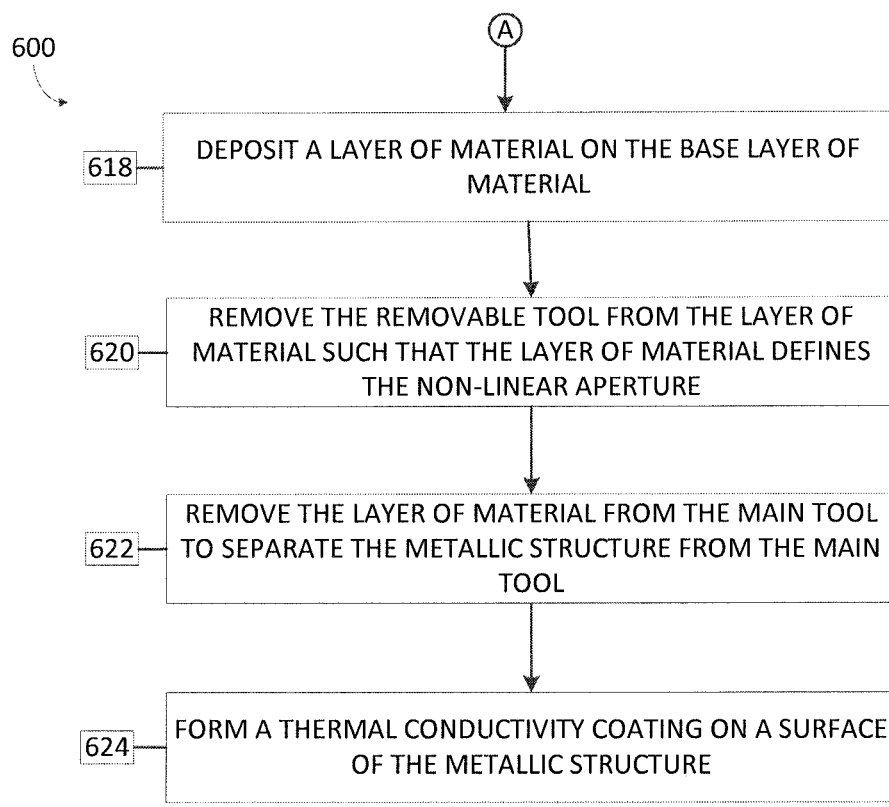

Turning now to FIGS. 6A and 6B, a method 600 for forming a metallic structure with a non-linear aperture is shown. In various embodiments, the steps of the method 600 may be performed in the order shown, or may be performed in a different order. In block 602, a main tool is formed. The main tool may have a formation surface. The main tool may be formed in a similar manner as the tool described above with reference to FIG. 2. In block 604, a temporary tool may be formed. The temporary tool may also be Ruined in a similar manner as the tool described above with reference to FIG. 2.

In block 606, a slot may be formed in the main tool. The slot may be formed in a similar manner as the recess 520 of FIG. 5A. In that regard, the slot may be formed by removing a portion of the main tool, or the main tool may be initially formed to have the slot. The slot may have a similar or a different shape than the recess 520.

In block 608, the temporary tool may be positioned in the slot. In block 610, a base layer of material may be formed on the formation surface of the main tool. In response to formation of the base layer of material, the temporary tool may reduce the likelihood of the material received by the slot of the main tool.

In block 612, the temporary tool may be removed from the slot. In that regard, the slot may extend from the main tool through the base layer of material. The temporary tool may be removed in a similar manner as the at least one layer of material is removed from the formation surface of FIG. 2. For example, the temporary tool may be manually removed from the slot, may be etched from the slot, may be melted from the slot, or the like.

In block 614, a removable tool may be formed. The removable tool may be formed in a similar manner as the tool described above with reference to FIG. 2. The removable tool may be formed to have a shape that corresponds to a desired aperture shape of a non-linear aperture of the final metallic structure. In various embodiments, the removable tool may be non-linear, meaning that the removable tool may have at least one bend. The bend may include at least one of an angle or a curve. In various embodiments, the removable tool may be linear.

Due to the shape of the removable tool, it may be desirable for the removable tool to be leachable (i.e., capable of being melted or etched from the final metallic structure). In that regard, the material of the removable tool may be selected in such a way that the removable tool may be leached from the metallic structure. The removable tool may include a metallic or a nonmetallic material. For example, the removable tool may include a nickel. In response to exposure to an acid, such as nitric acid, exposed surfaces of the nickel become etched away via the nitric acid. As another example, the removable tool may include an alumina-silica material.

The removable tool may have a connection end capable of being attached to the main tool. In block 616, the connection end of the removable tool may be positioned within the slot defined by the main tool and/or the base layer of material. The removable tool may be attached to the main tool in response to the slot receiving the removable tool.

In various embodiments, the removable tool may be attached to the main tool in a variety of other manners, such as via use of an adhesive or a fastener. In that regard and in various embodiments, the method 600 may include attaching the removable tool to the main tool instead of the steps performed in one or more of block 604, 606, 608, 610, 612, 614, and 616. For example, after forming the main tool, the method 600 may include attaching the removable tool to the main tool via an adhesive or a fastener instead of block 604, 606, 608, 610, 612, 614, and 616.

In block 618, a layer of material may be deposited on the base layer of material (or directly on the formation surface of the main tool) using a cold spray technique. The layer of material may be deposited in such a way that it envelops, or surrounds, the removable tool.

In block 620, the removable tool may be removed from the layer of material. In response to removal of the removable tool, the layer of material may define an aperture that corresponds to the shape of the removable tool. If the tool is non-linear, it may be relatively difficult to manually remove the removable tool from the layer of material. In that regard, the removable tool may be removed via melting or etching as described above. In various embodiments, if the tool is linear, the tool may be removed manually or via melting or etching.

In block 622, the layer of material may be removed from the main tool. In various embodiments, block 622 may be performed prior to block 620. The layer of material may be removed from the main tool in a similar manner as the layer of material of FIG. 2. In response to the removable tool being removed from the layer of material and the layer of material being removed from the main tool, the layer of material may be a metallic structure having a non-linear aperture. In various embodiments, the metallic structure may be a sheet structure as described above.

In block 624, a thermal conductivity coating may be formed on a surface of the metallic structure (i.e., the layer of material) via a deposition tool. The deposition tool may include any tool capable of depositing or placing the low thermal conductivity coating on the surface of the metallic structure. For example, the deposition tool may include a spray gun, a brush, or the like. The low thermal conductivity coating may include any material that is capable of withstanding greater temperatures than the layer of material and reduces transfer of heat to the layer of material. For example, the low thermal conductivity coating may include one or more of a ceramic having a crystal structure of zirconium dioxide stabilized by addition of yttrium oxide (yttria-stabilized zirconia), a silicate material of post-clay genesis (mullite or porcelainite), aluminum oxide, and/or cerium oxide.

The metallic structure may be used in a component of a gas turbine engine, such as the gas turbine engine 20 of FIG. 1. In that regard, the non-linear aperture of the metallic structure may provide cooling functions or acoustic attenuation. For example, a coolant may enter the non-linear aperture on one surface of the metallic structure, and the coolant may exit the non-linear aperture on a second surface of the metallic structure, thus reducing an ambient temperature near the second surface of the metallic structure. The metallic structure may also be positioned in a location that experiences a relatively high acoustic volume. In that regard, the shape of the non-linear aperture may be designed to reduce the ambient noise at one or more frequency.

Figure 7A:
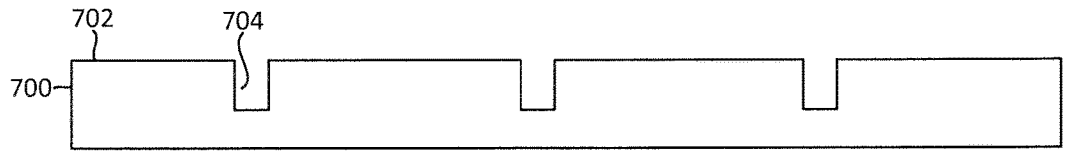
FIGS. 7A-7F are drawings illustrating various steps for forming a metallic structure having a non-linear aperture using a cold spray technique, in accordance with various embodiments.

Referring to FIGS. 7A through 7F, an exemplary implementation of the method 600 is shown. In FIG. 7A, a main tool 700 is provided. The main tool 700 may have a formation surface 702. The main tool 700 may also include a slot 704. The slot 704 may have an opening at the formation surface 702.

Figure 7B:
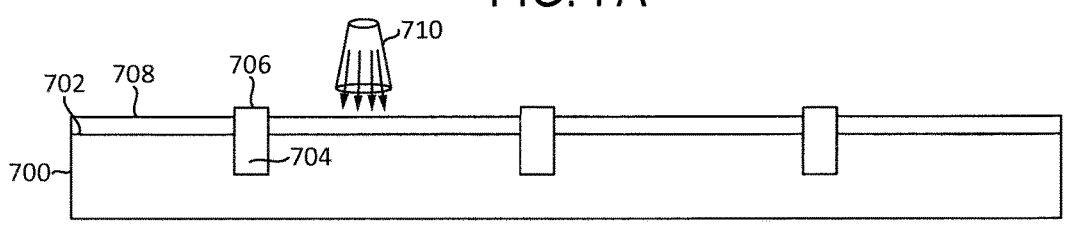

In FIG. 7B, a temporary tool 706 may be positioned in the slot 704. After the temporary tool 706 is positioned in the slot 704, a cold spray gun 710 may apply a base layer of material 708 on the formation surface 702 of the main tool 700. The temporary tool 706 may reduce the likelihood of any of the base layer of material 708 being received by the slot 704. After formation of the base layer of material 708, the temporary tool 706 may be removed from the slot 704. In that regard, the base layer of material 708 has an opening 709 that is aligned with the slot 704.

In various embodiments, the temporary tool 706 may not be provided. In that regard, the base layer of material 708 may be manufactured as a continuous surface and a recess may be drilled or otherwise machined into the continuous surface.

Figure 7C:
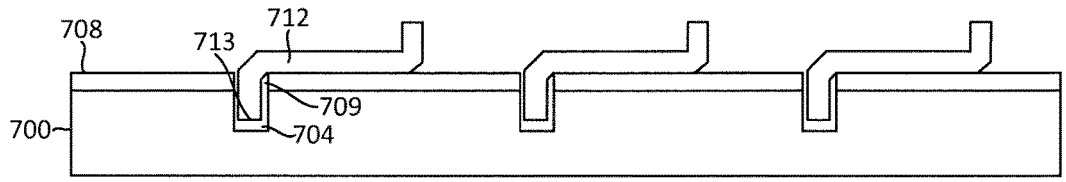

In FIG. 7C, a removable tool 712 may be provided. The removable tool 712 may be coupled to the main tool 700. The removable tool 712 is shown as individual components, however, in various embodiments a removable tool may be provided with joined segments to form a more complex shape or pattern. For example, as shown in FIG. 7C, the removable tool 712 includes a connection end 713. The connection end 713 may be positioned within the slot 704 (through the opening 709). In that regard, the removable tool 712 may be considered to be attached to the main tool 700.

Figure 7D:
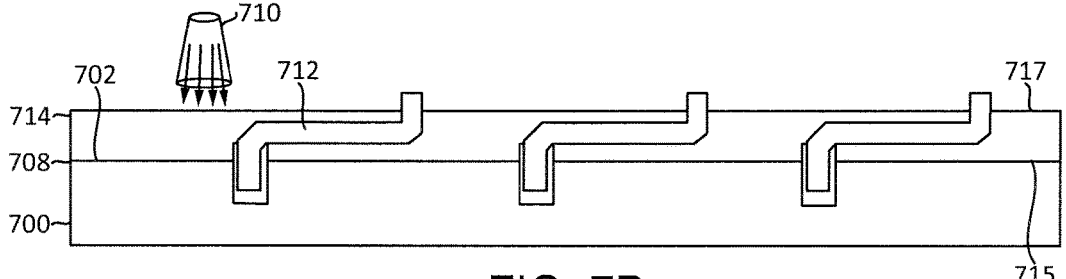

In FIG. 7D, the cold spray gun 710 may deposit a layer of material 714 on the base layer of material 708. In various embodiments, the base layer of material 708 may not be applied. In that regard, the layer of material 714 may be applied directly to the formation surface 702 of the main tool 700. The cold spray gun 710 may be used to deposit the layer of material 714 around the removable tool 712. In that regard, at least a portion of the removable tool 712 may be surrounded by the layer of material 714. The layer of material 714 may have a first surface 717 and a second surface 715. The second surface 715 may be in contact with the formation surface 702 of the main tool 700.

In various embodiments, as the cold spray gun 710 deposits the layer of material 714, the cold spray gun 710 may be manipulated to directly deposit the material 714 underneath the removable tool 712. Stated differently, the cold spray gun 710 may be manipulated to have a direct line of sight to an area beneath a horizontal portion of the removable tool 712 such that material may be deposited evenly upon the first layer of material 708.

Figure 7E:
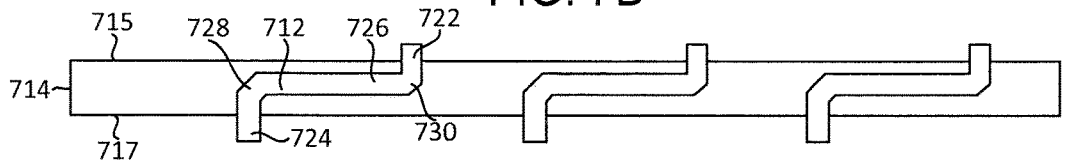

In FIG. 7E, the layer of material 714 (along with the removable tool 712) may be separated from the main tool 700. In various embodiments, the removable tool 712 may be removed from the layer of material 714 prior to the layer of material 714 being separated from the main tool.

In various embodiments, a portion of the removable tool 712 that faced away from the cold spray gun 710 during application of the layer of material 714 may not be surrounded by the layer of material 714 (i.e., due to the removable tool 712 redirecting the material away from the area). It may be desirable for this portion of the removable tool 712 to be surrounded by the layer of material 714. In that regard, the layer of material 714 may be turned 180 degrees or nearly 180 degrees such that the second surface 715 is directed upwards (towards the cold spray gun 710). The cold spray gun 710 may then apply additional material to the layer of material 714 to fill in the space around the removable tool 712.

As described above, the removable tool 712 may be non-linear. In that regard, the removable tool 712 may include a first portion 724, a second portion 722, and a third portion 726. The third portion 726 may connect the first portion 724 to the second portion 722. The removable tool 712 may include at least 2 bends including a first bend 728 that separates the first portion 724 from the third portion 726 and a second bend 730 that separates the second portion 722 from the third portion 726.

The removable tool 712 as shown includes a constant cross-section as it transitions from ends 724 to 722. In various embodiments, the removable tool 712 may include a taper such that the end 724 has a smaller cross-sectional area than the end 722 or vice versa to meter or limit the flow of coolant flowing in each subsequently formed passage.

Figure 7F:
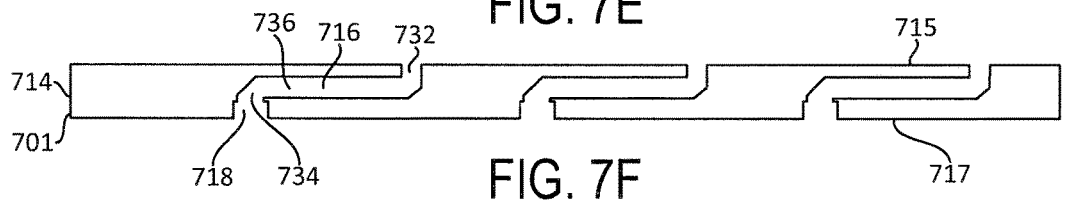

In FIG. 7F, the removable tool 712 may be removed from the layer of material 714 to form a non-linear aperture 716. For example, the removable tool 712 may be etched from the layer of material 714 using an acid or another etching material. In various embodiments, the removable tool 712 may have a melting temperature below that of the layer of material 714. In that regard, the combination of the layer of material 714 and the removable tool 712 may be heated to the melting temperature of the removable tool 712 in order to melt the removable tool 712 away from the layer of material 714. The layer of material 714 with the non-linear aperture 716 may be referred to as a metallic structure 701 with a non-linear aperture.

The non-linear aperture 716 may have a shape that corresponds to the shape of the removable tool 712. In that regard, the non-linear aperture 716 has a first portion 734, a second portion 732, and a third portion 736. The first portion 734 may extend into the non-linear aperture 716 via the first surface 717 of the layer of material 714 and the second portion 732 may extend into the non-linear aperture 716 via the second surface 715 of the layer of material 714. The first portion 734 may be positioned such that it is not directly aligned with the second portion 732, as shown. The third portion 736 may connect the first portion 734 with the second portion 732 within the layer of material 714.

In various embodiments, an aperture feature 718 may be formed in the non-linear aperture 716 in one or both of the first surface 717 or the second surface 715. For example, the aperture feature 718 may be formed in any of a variety of manners such as etching, drilling, or the like. The aperture feature 718 may provide a function such as fluid diffusion, acoustic attenuation of noise having a particular frequency, or the like.

Forming such a non-linear aperture 716 using the cold-spray deposition technique as described herein provides several advantages over forming a non-linear aperture using investment casting. When forming a component using investment casting, a wall of the final component may be limited by a certain minimum thickness, such as 0.06 inches (1.524 mm). When forming such a part using a cold-spray deposition technique, however, the walls may be formed to have a thickness that is relatively small, resulting in a final part that desirably has less weight.

Furthermore, difficulties may arise when using investment casting if the part has a relatively large surface area as more casting runners are required to form parts with a relatively large surface area. Inclusion of additional casting runners increases the difficulty of achieving a desirable grain formation and increases the difficulty of post-machining of the part, leading to overall difficulty in forming parts with such complex shapes. When forming such a part using a cold-spray deposition technique, however, such difficulties fail to arise.

Figure 8A:
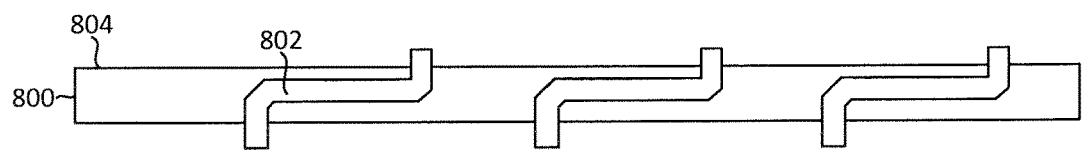
FIGS. 8A-8C are drawings illustrating various steps for forming a metallic structure having a non-linear aperture and a low thermal conductivity coating using a cold spray technique, in accordance with various embodiments.
Figure 8B:
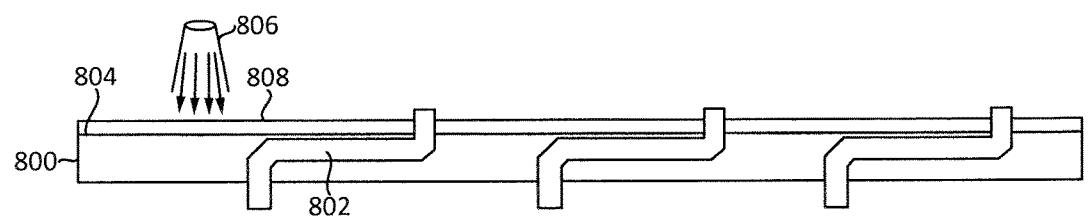
Figure 8C:
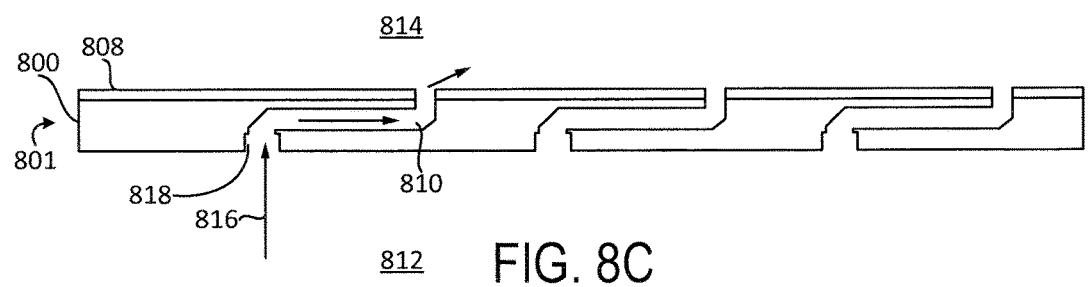

Referring now to FIGS. 8A through 8C, another implementation of a portion of the method 600 of FIGS. 6A and 6B is shown. In FIG. 8A, a layer of material 800 has previously been formed about a removable tool 802 and separated from a main tool. The layer of material 800 has a surface 804. In various embodiments, the resulting metallic structure 801 may be positioned between a first area 812 and a second area 814 that has a greater temperature than the first area 812. In that regard, a non-linear aperture 810 may facilitate a flow of coolant from the first area 812 to the second area 814 as shown by arrows 816.

In various embodiments, it may be desirable to reduce an amount of heat experienced by the surface 804 of the layer of material 800. In that regard and in FIG. 8B, a deposition tool 806 may be used to deposit a low thermal conductivity coating 808 on the surface 804 of the layer of material 800. The deposition tool 806 may include any tool capable of depositing or placing the low thermal conductivity coating 808. For example, the deposition tool 806 may include a spray gun, a brush, or the like. The low thermal conductivity coating 808 may include any material that is capable of withstanding greater temperatures than the layer of material 800 and reduces transfer of heat to the layer of material 800. For example, the low thermal conductivity coating 808 may include one or more of a ceramic having a crystal structure of zirconium dioxide stabilized by addition of yttrium oxide (yttria-stabilized zirconia), a silicate material of post-clay genesis (mullite or porcelainite), aluminum oxide, and/or cerium oxide.

In various embodiments, the low thermal conductivity coating 808 may be deposited on the surface 804 prior to removal of the removable tool 802. As shown in FIG. 8C, after removal of the removable tool, the non-linear aperture 810 may extend through the layer of material 800 and the low thermal conductivity coating 808 due to the removable tool 802 being in place during deposition of the low thermal conductivity coating 808.

Figure 9A:
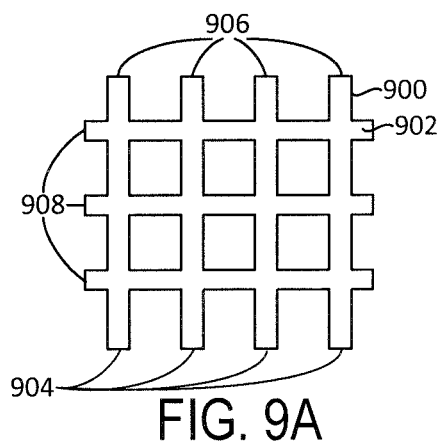
FIGS. 9A-9D are drawings illustrating various shapes of removable tools usable for forming various non-linear apertures, in accordance with various embodiments.

Referring to FIG. 9A, a removable tool 900 may be used to form a non-linear aperture 902. The non-linear aperture 902 may have a shape that corresponds to a grid. In that regard, the non-linear aperture 902 includes a plurality of inlets 904 connected to a plurality of outlets 906 via a plurality of internal channels 908. Fluid or sound may enter the non-linear aperture 902 via one or more of the inlets 904, may flow through one or more of the internal channels 908, and may exit the non-linear aperture 902 via one or more of the outlets 906.

Figure 9B:
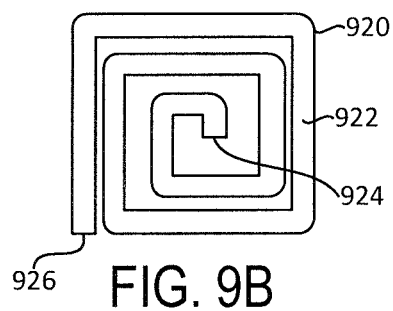

Turning to FIG. 9B, another removable tool 920 may be used to form a non-linear aperture 922. The non-linear aperture 922 may have a shape that corresponds to a rectilinear spiral. The non-linear aperture 922 includes a first end 924 and a second end 926. In various embodiments, fluid or sound may enter the non-linear aperture 922 via the first end 924 or the second end 926 and may flow out the non-linear aperture 922 via the other of the first end 924 or the second end 926.

Figure 9C:
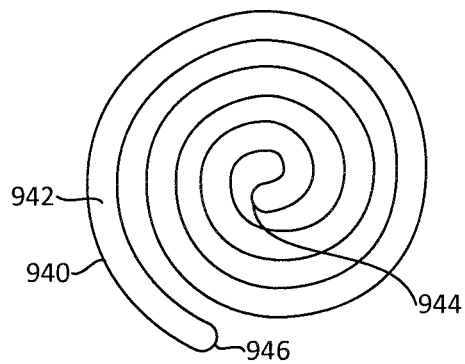

Turning to FIG. 9C, another removable tool 940 may be used to form a non-linear aperture 942. The non-linear aperture 942 may have a shape that corresponds to a rounded spiral. The non-linear aperture 942 includes a first end 944 and a second end 946. In various embodiments, fluid or sound may enter the non-linear aperture 942 via the first end 944 or the second end 946 and may flow out of the non-linear aperture 942 via the other of the first end 944 or the second end 946.

Figure 9D:
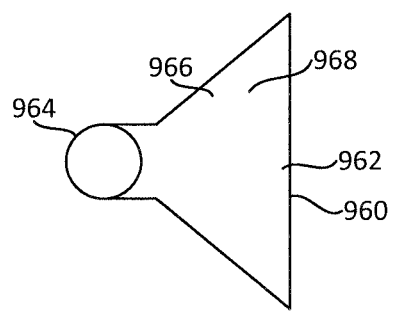

Turning to FIG. 9D, another removable tool 960 may be used to form a non-linear aperture 962. The non-linear aperture 962 includes a first portion 964 and a second portion 966. The first portion 964 corresponds to a channel through which fluid or sound may travel and may resemble a tube. The second portion 966 also corresponds to a channel through which fluid or sound may travel and may resemble a cone. The second portion 966 may be used as a diffusion feature 968 due to the conic structure of the second portion 966. In various embodiments, fluid or sound may enter the non-linear aperture 962 via the first portion 964 or the second portion 966 and may flow out the non-linear aperture 962 via the other of the first portion 964 or the second portion 966.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a metallic structure having an aperture with a bend, comprising:
    providing a main tool having a formation surface corresponding to a desired structure shape of the metallic structure;
    attaching a removable tool having a shape corresponding to a desired aperture shape of the aperture with the bend to the main tool;
    depositing a layer of material on the formation surface using a cold-spray technique;
    removing the removable tool from the layer of material such that the layer of material defines the aperture with the bend;
    forming a base layer of material on the formation surface using the cold-spray technique prior to attaching the removable tool to the main tool; and
    positioning a temporary tool into a slot defined by the main tool prior to forming the base layer of material on the formation surface.

2. The method of claim 1, further comprising removing the layer of material from the main tool to separate the metallic structure having the non-linear aperture from the main tool.

3. The method of claim 1, further comprising removing the temporary tool from the slot after forming the base layer of material on the formation surface and prior to attaching the removable tool to the main tool.

4. The method of claim 3, wherein attaching the removable tool to the main tool includes positioning a connection end of the removable tool into the slot defined by the main tool.

5. The method of claim 1, further including forming a thermal conductivity coating on a surface of the metallic structure, the thermal conductivity coating being one or more of ceramic having a crystal structure of zirconium dioxide stabilized by addition of yttrium oxide, a silicate material of post-clay genesis, aluminum oxide, or cerium oxide.

6. The method of claim 1, wherein removing the removable tool includes leaching the removable tool from the layer of material via at least one of etching the removable tool from the layer of material or melting the removable tool from the layer of material.

7. The method of claim 1, wherein the removable tool has at least two bends such that the aperture with the bend includes a first portion extending into the metallic structure from a first surface of the metallic structure, a second portion extending into the metallic structure from a second surface of the metallic structure, and a third portion extending from the first portion to the second portion.

8. The method of claim 1, wherein the removable tool is in the shape of a grid, a rounded spiral, or a rectilinear spiral.

9. The method of claim 1, wherein a portion of the removable tool has a conical shape such that the aperture with the bend has a diffusion feature corresponding to the conical shape.

10. The method of claim 1, wherein the metallic structure is used in a gas turbine engine, and the aperture with the bend provides a channel for cooling fluid or acoustic attenuation.

11. The method of claim 1, wherein depositing the layer of material on the formation surface using the cold-spray technique includes manipulating a cold spray gun to have a direct line of sight to deposit the layer of material on all desired portions of the formation surface.

12. The method of claim 1, further comprising depositing a second layer of material on a second surface of the layer of material to fill any voids defined by the removable tool.

* * * * *